Dec. 22, 1931.   H. A. HADLEY   1,837,815

DASHPOT

Filed July 5. 1927

INVENTOR
HARLAN A. HADLEY
BY
*Henry Sherman*
ATTORNEY

Patented Dec. 22, 1931

1,837,815

UNITED STATES PATENT OFFICE

HARLAN A. HADLEY, OF ST. JOHNSBURY, VERMONT, ASSIGNOR TO E. AND T. FAIRBANKS AND COMPANY, OF ST. JOHNSBURY, VERMONT, A CORPORATION OF VERMONT

DASHPOT

Application filed July 5, 1927. Serial No. 203,385.

This invention relates to improvements in dash pots of that type in which the dampening effect is controlled by adjusting the flow of the fluid. While the invention is of general application where dampening devices are applicable, the illustrated preferred embodiment is shown as applied to a scale of the equal arm type.

A well-known device of the class referred to embodies, as a flow regulating means, two superposed disks having a plurality of registering openings. One of these disks is rigidly attached to the piston rod and the other disk is rigidly connected to the lower end of a sleeve telescoping the piston rod. The dampening effect is regulated by turning the sleeve relative to the piston rod which either widens or narrows the registering openings to increase or decrease the rate of the flow of the fluid through to the piston formed by the superposed disks. The disadvantage of such a construction resides in the limited latitude of adjustment of the flow of the fluid past the piston. It is accordingly an object of this invention to provide an improved dash pot construction adapted to check and control the vibration of scales which will be free from the above-mentioned and other disadvantages, allowing a wide latitude of fluid flow adjustment, and which will be more simple, durable and inexpensive in construction and more efficient in operation.

Other features of the invention, together with certain details of construction and combination of parts, will be discussed in the specification and pointed out in the appended claims.

Figure 5:
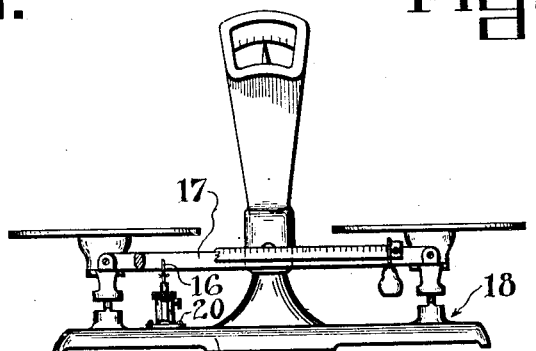
Fig. 5 is a front elevational view of a scale showing my improved dash pot attached to a scale lever of an equal arm balance.

In the illustrative device there is shown an outer cylinder generally indicated by the reference number 1. This cylinder is a casting having at the bottom thereof an integral flange 2 carrying diametrically opposed bosses 3 having apertures 4 therein adapted for the reception of screws to attach the dashpot to a scale, as is shown in Fig. 5. The outer cylinder has cast integrally therewith and extending vertically thereof a chamber 5, the purpose of which will herein be explained.

A cap 6 is adapted to act as a closure member for outer cylinder 1, which it surmounts, the said cap having a flanged portion 7 and a reduced portion 8 through which an aperture 9 is bored. Attached to the inner periphery of the flange 7, preferably by a force fit, is a cylinder 10 having a rectangular slot 11 therein extending substantially the full length thereof. The cylinder 10 is adapted to telescope down on the inside of outer cylinder 1 and will hereinafter be designated as the inner cylinder.

The dash pot piston 12 is mounted on the inner end of a piston rod 13. The outer end of the piston rod extends out through the aperture 9 in the reduced portion 8 of cap 6 and is reduced at its extremity to form a flat portion 14 which has an aperture 15 therein. The flat portion and the aperture therein form a connection to a clevis 16 attached to a scale lever 17 of an equal arm scale 18. The dash pot outer cylinder being fastened to a base 19 of the scale as by screws 20.

Figure 1:
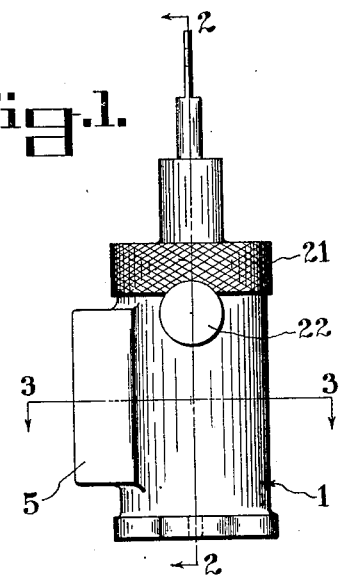
Fig. 1 is a front elevational view of my improved dash pot.
Figure 2:
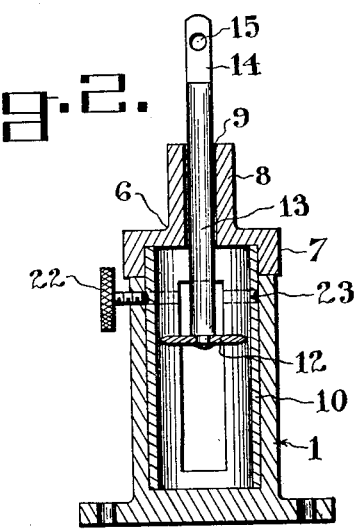
Fig. 2 is a vertical cross-sectional view taken on line 2—2 in Fig. 1.
Figure 3:
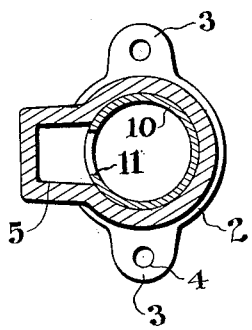
Fig. 3 is a horizontal cross-sectional view taken on line 3—3 in Fig. 1 showing the parts in position when the least resistance will be offered to the flow of the fluid.
Figure 4:
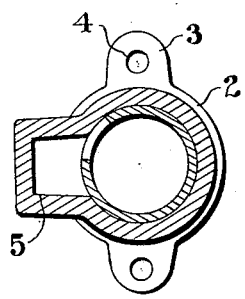
Fig. 4 is a view similar to Fig. 3 but showing the inner cylinder revolved relative to the chamber to offer a greater resistance to the flow of the fluid.

In operation, when the slot 11 and the chamber 5 coincide, as is shown in Figure 3, there will be a minimum of resistance to the flow of the fluid contained in the cylinders and therefore the checking or dampening effect is at a minimum. As the inner cylinder 10 is rotated by turning the cap 6, as shown in Figure 4, the slot 11 is moved relative to the chamber opening, the flow of the fluid becomes more and more restricted as the opening into the inner cylinder becomes smaller and the dampening effect is accordingly increased. The cap is knurled, as at 21, to facilitate the turning of the inner cylinder, said cylinder being held in its adjusted position by means of a set screw 22 cooperating with groove 23 in the outer periphery of the inner cylinder.

Having described my invention, what I claim as new and desire to secure by Letters Patent of the United States, is:

1. In a device of the character described, an outer cylinder, a chamber connected therewith, an inner cylinder telescoping said first named cylinder and having closure means thereon co-operating with the said outer cylinder, and means in said inner cylinder for cooperating with the chamber to control the flow of a fluid therethrough.

2. In a device of the character described, an outer cylinder, a chamber connected therewith, an inner cylinder telescoping said first named cylinder, having rotatable closure means for adjusting the said inner cylinder and also having a slot therein, said slot cooperating with said chamber to control the flow of a fluid therethrough.

3. In a device of the character described, an outer cylinder, a chamber connected therewith, and an inner cylinder telescoping said outer cylinder rotatable therein and surmounted by a closure member provided with a flange portion co-operating with and rotatable on the upper end of the said outer cylinder, said cylinder having a slot therein, the cylinder being movable relative to the chamber to control the flow of a fluid therethrough.

4. In a device of the character described, a cylinder, a chamber connected therewith, a cap surmounting the outer cylinder, a cylinder attached to said cap and adapted to be rotated thereby, and means in said second-mentioned cylinder adapted to cooperate with said chamber to control the flow of a fluid.

5. In a device of the character described, an outer cylinder, a chamber connected therewith, a cap surmounting the outer cylinder, an inner cylinder rotatable within said outer cylinder, said inner cylinder being attached to said cap, and means in said inner cylinder adapted to cooperate with said chamber to control the flow of a fluid therethrough.

6. In a device of the character described, an outer cylinder, a chamber connected therewith, a cap surmounting the outer cylinder, an inner cylinder attached to said cap contained within said outer cylinder and rotatable therein, said inner cylinder having a slot therein adapted to cooperate with said chamber to control the flow of a fluid therethrough, a piston movable in said inner cylinder and a piston rod connected to said piston and extending through said cap.

7. In a device of the character described, a cap, and a telescoping inner and outer cylinder, the inner cylinder being attached to the cap and adjustably mounted on the outer cylinder, a chamber in the outer cylinder, the inner cylinder having a slot therein, the said chamber and slot cooperating to control the flow of a fluid therethrough.

8. In a device of the character described, an outer cylinder, a chamber connected therewith, a cap surmounting the outer cylinder, an inner cylinder attached to the said cap and rotatable within the said outer cylinder, and means in the outer cylinder cooperating with a groove in the outer wall of the said inner cylinder for securing the inner cylinder in its adjusted position.

9. In a device of the character described, an outer cylinder, a chamber connected therewith, a cap surmounting the outer cylinder, an inner cylinder attached to the said cap and rotatable within the said outer cylinder, means in the outer cylinder co-operating with a groove in the outer wall of the said inner cylinder for securing the inner cylinder in its adjusted position, and means in the said inner cylinder adapted to co-operate with the said chamber to control the flow of a fluid therethrough.

10. In a device of the character described, a cap surmounting the outer cylinder, telescoping inner and outer cylinders, the inner cylinder being attached to the cap and being adjustably mounted on the outer cylinder, a chamber in the outer cylinder, the inner cylinder having a slot therein, the said chamber and slot co-operating to control the flow of a fluid therethrough, and means in the outer cylinder co-operating with the inner cylinder for locking the said inner cylinder in its adjusted position.

11. In a device of the character described, an outer cylinder, a chamber connected therewith, a cap surmounting the outer cylinder, an inner cylinder attached to said cap and adapted to be rotated thereby, the inner cylinder being provided with a slot therein cooperating with an opening in the outer cylinder leading to the said chamber, and a vertically operating piston adapted to move in the said inner cylinder in co-operation with the said slot and opening and in accordance with the flow of a fluid therethrough.

In testimony whereof, I have signed my name to this specification.

HARLAN A. HADLEY.